(12) United States Patent
Hernandez et al.

(10) Patent No.: US 7,286,325 B2
(45) Date of Patent: Oct. 23, 2007

(54) METHOD AND APPARATUS FOR CONNECTING METAL STRUCTURES ON OPPOSING SIDES OF A CIRCUIT

(75) Inventors: Manuel Hernandez, San Jose, CA (US); Yen Fu, San Jose, CA (US)

(73) Assignee: SAE Magnetics (H.K.) Ltd, Shatin, N.T. (HK)

(*) Notice: Subject to any disclaimer, the term of this patent is extended or adjusted under 35 U.S.C. 154(b) by 183 days.

(21) Appl. No.: 10/860,163

(22) Filed: Jun. 2, 2004

(65) Prior Publication Data

US 2005/0190499 A1    Sep. 1, 2005

Related U.S. Application Data

(60) Provisional application No. 60/547,439, filed on Feb. 26, 2004.

(51) Int. Cl.
  *G11B 17/32* (2006.01)
(52) U.S. Cl. .................................. 360/234.5
(58) Field of Classification Search ............ 360/234.5
  See application file for complete search history.

(56) References Cited

U.S. PATENT DOCUMENTS 5,001,583 A * 3/1991 Matsuzaki ............ 360/234.5
6,396,141 B2 * 5/2002 Schueller et al. ........... 257/706
2001/0000156 A1 * 4/2001 Cheng ........................ 438/612
2004/0089700 A1 * 5/2004 Sato et al. ............. 228/180.22
2006/0087011 A1 * 4/2006 Kanagawa et al. ......... 257/676
2006/0220227 A1 * 10/2006 Marro ........................ 257/723

FOREIGN PATENT DOCUMENTS

EP          0603623 A2  *  6/1994
JP          9-306950     * 11/1997
JP          09306950 A   * 11/1997

* cited by examiner

*Primary Examiner*—Allen Cao
(74) *Attorney, Agent, or Firm*—Kenyon & Kenyon LLP

(57) ABSTRACT

According to an embodiment of the present invention, an improved method and system are provided. In one embodiment, a conductive connection is made between two metal layers separated by an intermediate insulating layer by providing vias between one of the metal layers and the insulating layer. A conductor, such as a conductive sphere made of gold is disposed into the vias and pressed so as to create a conductive connection between the metal layers. In a further embodiment, vias are created in both metal layers. In such a case, a fixture support may be provided so that when the conductive sphere is pressed into the vias, it is also pressed into the support to improve the conductive connection.

17 Claims, 9 Drawing Sheets

METHOD AND APPARATUS FOR CONNECTING METAL STRUCTURES ON OPPOSING SIDES OF A CIRCUIT

RELATED APPLICATIONS

The present application claims priority to U.S. Provisional Application No. 60/547,439 filed on Feb. 26, 2004.

FIELD OF THE INVENTION

The present invention pertains to a method and apparatus for manufacturing electrical components. More particularly, the present invention pertains to providing an electrical connection between opposing conductive layers having one or more insulating layers between them.

BACKGROUND OF THE INVENTION

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high-speed rotation of a magnetic disk generates a stream of airflow or wind along its surface in a direction substantially parallel to the tangential velocity of the disk. The airflow cooperates with the ABS of the slider body, which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions.

The transducers are built on a substrate, called a wafer, which is made of electrically conductive material, such as AlTiC, with processes similar to those for semiconductor devices. Gold pads on the external surface of the recording head are electrically connected to the recording devices through internal electrical paths built during the wafer-level processes. The wafer is then sliced into rectangular pieces with an individual recording head on each piece with the substrate attached, which is called a slider. Afterwards, the slider is mounted on a suspension. The assembly is called a head gimbal assembly, or HGA. The slider is then bonded on the suspension with glues, including a conductive glue to form an electrical connection between the substrate and a stainless steel component of the suspension. Additional electrical connections are made between the gold pads on the recording head and metal trace lines on the suspension with methods including ultrasonic bonding or soldering. Finally, the HGA is assembled into a hard disk drive device with the suspension traces connected to other electrical components, typically a pre-amplifier, and the stainless steel part of the suspension connected to the electrical ground of the drive.

Generally, there are two types of HGAs—wired and wireless. A wired HGA is one where separate lead wires are connected between the flex circuit of the HSA and the read write head. A wireless HGA is one where conductive traces are integrated with the flexure and provide conductivity between the flex circuit of the HSA and the read write head of the slider. In the art, there are typically two types of wireless suspensions. In the first type, such as trace suspension assemblies (TSAs) and circuit integrated suspension (CISs), traces are built though a subtractive process (e.g., an etching operation) or through an additive process (e.g., a plating or deposition process) on the stainless steel flexure, with an insulative layer between the trace and the flexure. After the traces are set in place, the flexure can then be welded to other parts of the suspension. In the second type, such as flex suspension assemblies (FSAs) and flex on suspension (FOS), the traces are built on an insulation layer and then covered with another insulation layer to form a flex circuit. This circuit is then attached to the suspension with adhesive. Alternatively, an additional metal layer called a ground plane can be attached to the flex circuit before it is adhered to the suspension. In an FSA, the flexure is integrated with a load beam and a mount plate along with the integrated traces for connectivity.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk. In the absence of the rails 2 and 4, the large surface area of the slider body 5 would produce an excessively large air bearing surface area. In general, as the air bearing surface area increases, the amount of lift created is also increased. Without rails, the slider would therefore fly too far from the rotating disk thereby foregoing all of the described benefits of having a low flying height.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 moves the HGA over various diameters of the disk 76 (e.g., inner diameter (ID), middle diameter (MD) and outer diameter (OD)) over arc 75.

In the disk drive arts as well as others, conductive material such as metal may be placed on both sides of an intermediate material. For example, a printed circuit board may be made of an insulating material having a metal layer on each side. As seen in FIG. 3, an insulating layer 31 may be provided with a first metal layer 33 on one side and a second metal layer 35 on the other. To conductively connect the first and second metal layers 33, 35, a via or hole is made through the insulating material and then plated (e.g., electroplating) with a conductive material. The conductive via 37 is a common way to couple two opposing metal layers together. A problem with creating such a conductive connection is that making the hole in the insulating layer 31 may be expensive (e.g., when using a single beam laser to form the hole).

Another common method for creating this conductive connection is shown in FIG. 4. Again, an insulating material 41 serves as an intermediate material between a first metal layer 43 and a second metal layer 45. In this method, a "blind hole" is made through the first metal layer 43 and the insulating material 41 and filled in with a conductive epoxy 47. A cover coat 49 made of an insulating material covers and protects the epoxy in the blind hole from contamination and oxidation. The conductive epoxy is made up of conductive metal flakes (e.g., silver) suspended in a non-conducting medium. The conductive path through the epoxy relies on chain of contact between the metal flakes. Accordingly, conductive epoxy 47 provides a relatively poor conductive connection between metal layer 41 and metal layer 45. Also, the use of the cover coat 49 adds a potentially costly step to the process of creating this connection.

In view of the above, there is a need for an improved method and apparatus for creating a conductive connection between opposing metal layers.

SUMMARY OF THE INVENTION

According to an embodiment of the present invention, an improved method and system are provided. In one embodiment, a structure is provided that includes first and second metal layers separated by an intermediate insulating layer. A hole is opened through two or all three of these layers, and a conductive ball (e.g., made of gold, a gold-plated conductor, etc.) is inserted into the hole, and then compressed within the hole (if necessary) to create the conductive connection between the metal layers. Alternatively, the conductive ball could be provided in the form of smaller particles or smaller balls. In this case, the conductor could be melted in the blind hole to create the metal connection.

DETAILED DESCRIPTION

Figure 1:
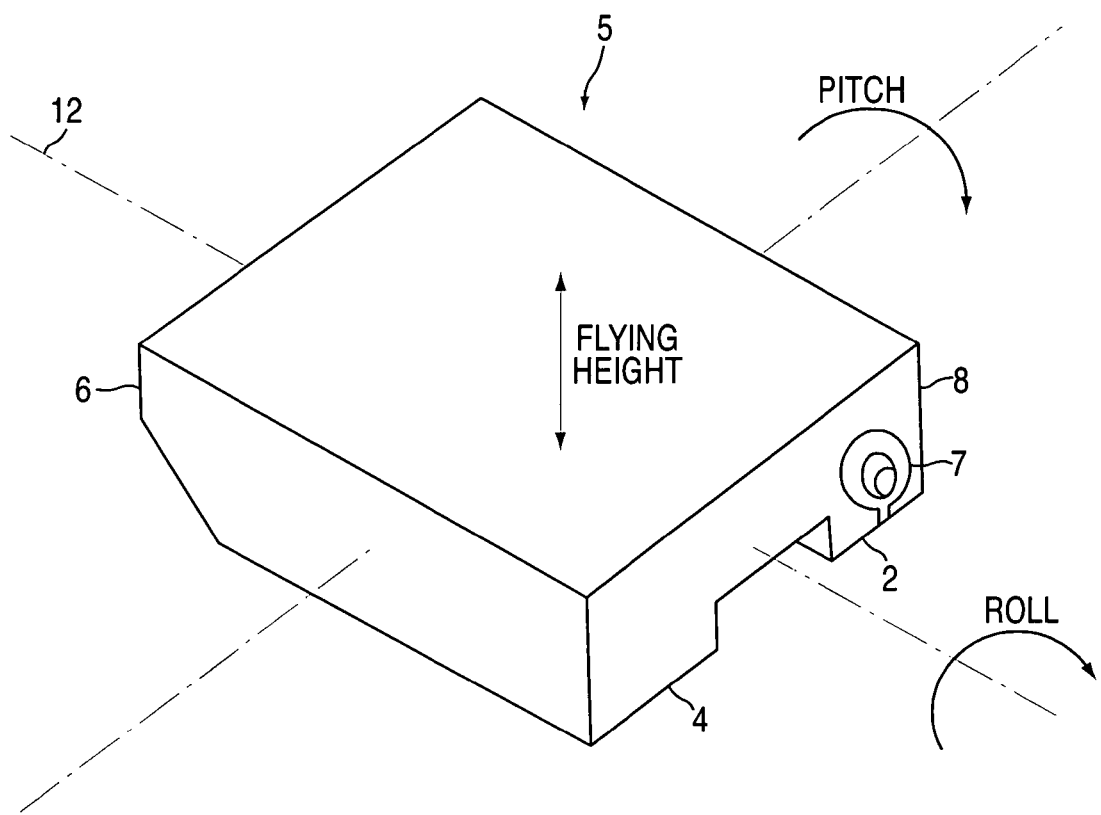
FIG. 1 is a perspective view of a flying slider with a read and write element assembly having a tapered conventional catamaran air bearing slider configuration.
Figure 2:
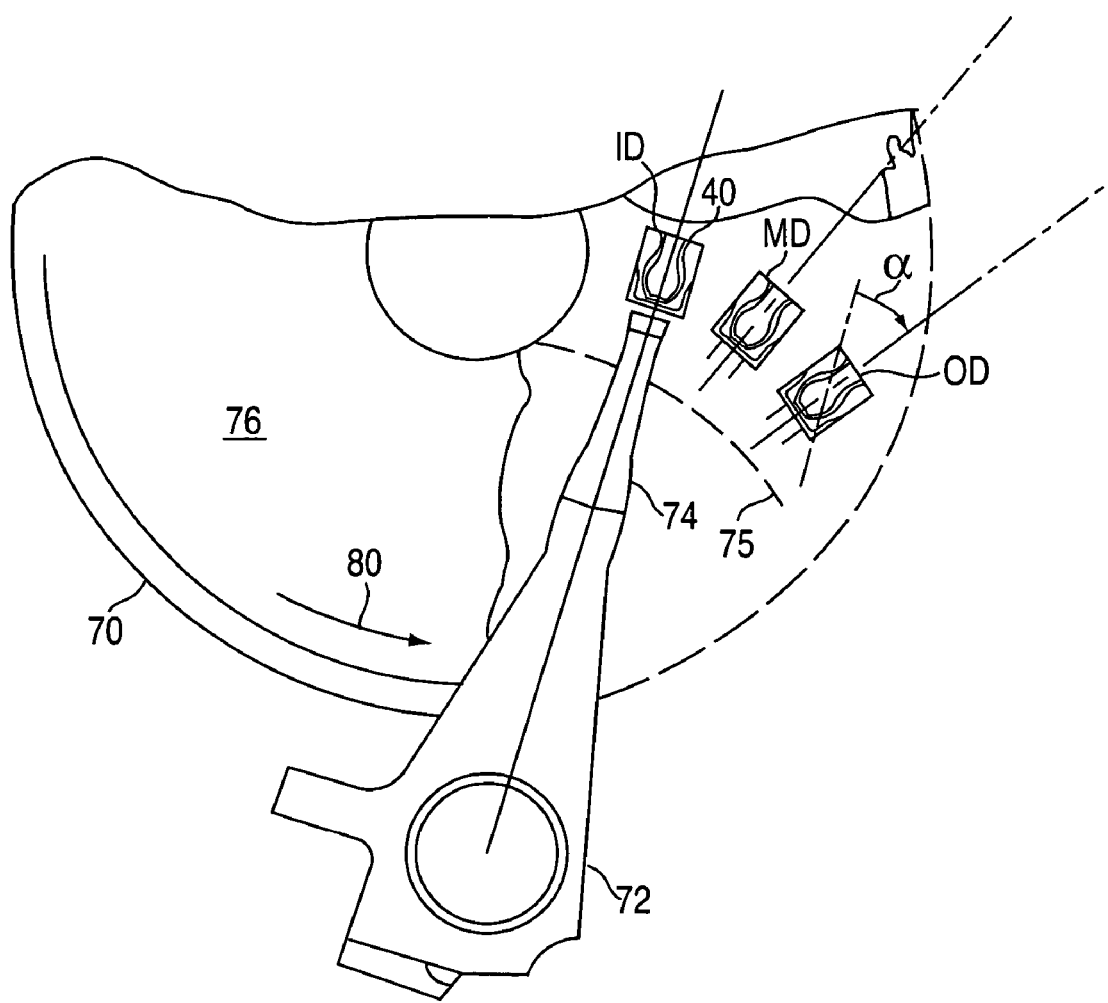
FIG. 2 is a plan view of a mounted air bearing slider over a moving magnetic storage medium.
Figure 3:
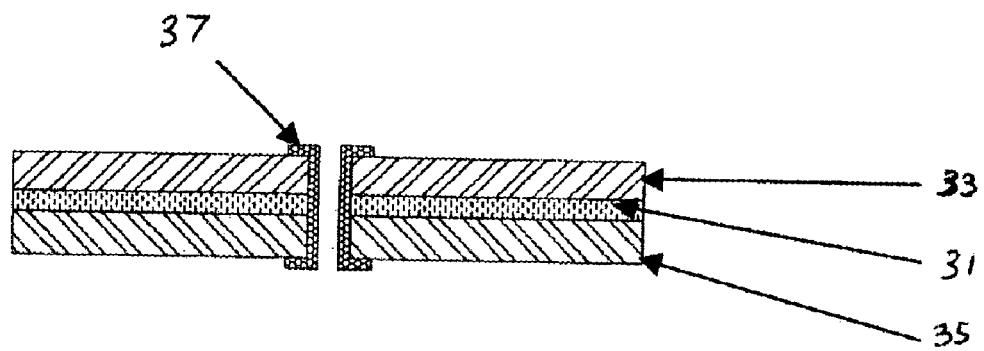
FIG. 3 is a cross section view of a workpiece including a conductive connection as known in the art.
Figure 4:
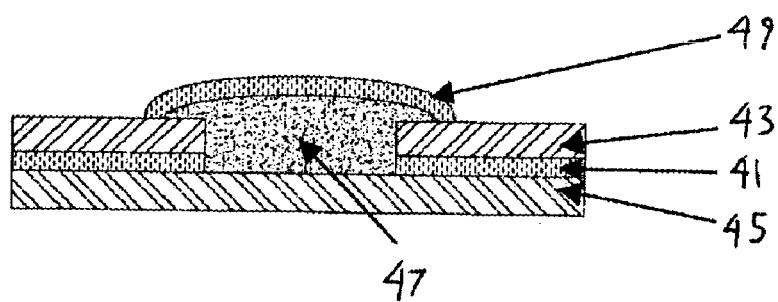
FIG. 4 another cross section view of a workpiece including a conductive connection as known in the art.
Figure 5A:
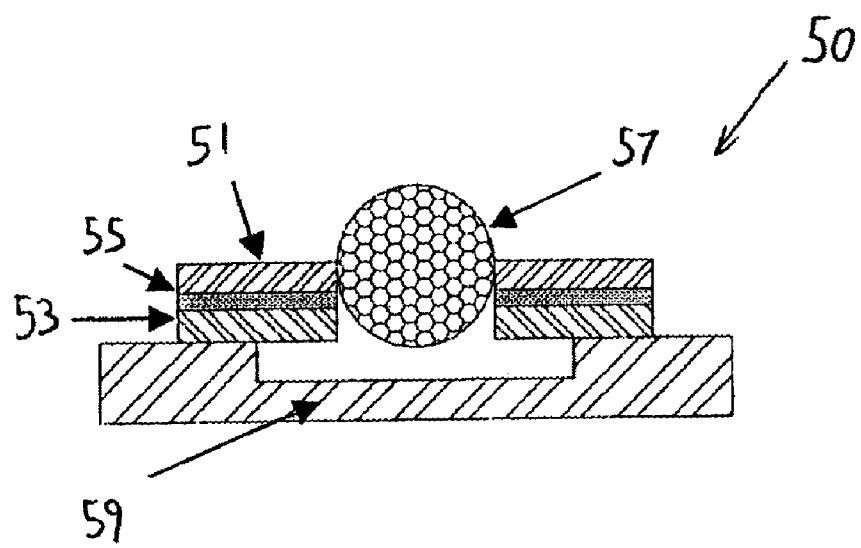
FIGS. 5a-b are cross sections of a workpiece showing the conductive connection of two metal layers according to an embodiment of the present invention.
Figure 5B:
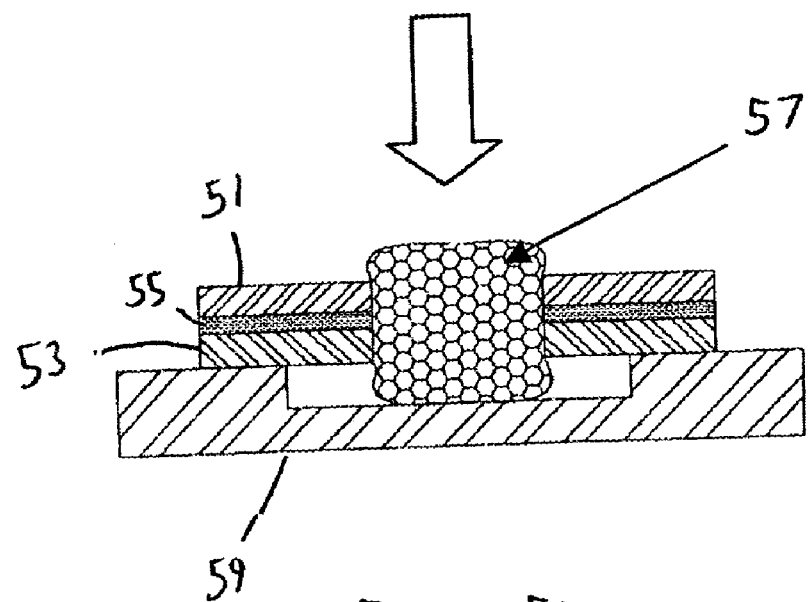

Referring to FIGS. 5a-b, a cross-section of a conductive connection between two metal layers is shown according to an embodiment of the present invention is shown. In this embodiment a structure including a first metal layer 51, a second metal layer 53 and an intermediate insulating layer 55 is provided. A hole or via is made through these layers where an electrical connection is desired between the first and second metal layers 51, 53. Vias may be made using any of a variety of known methods including the use of laser, IC chip fabrication processes (e.g., wafer etching), etc. A conductive sphere 57, such as one made of gold or is gold-plated is inserted into the via. The sphere is then pressed into the via to form an electrical contact between the first and second metal layers 51, 53. In this embodiment, the workpiece 50 including the metal layers 51, 53 and insulating layer 55 is placed on a fixture support 59 to facilitate the spreading of the sphere 57 in the via. For example, the fixture support 59 may be provided with a hollowed out area creating a space between the bottom of the workpiece and the top of the support 59. This allows an improved spreading of the sphere to make contact with the second metal layer 53. With a gold or gold-plated sphere, for example, ultrasonic bonding may be used to make an improved electrical connection.

Figure 6:
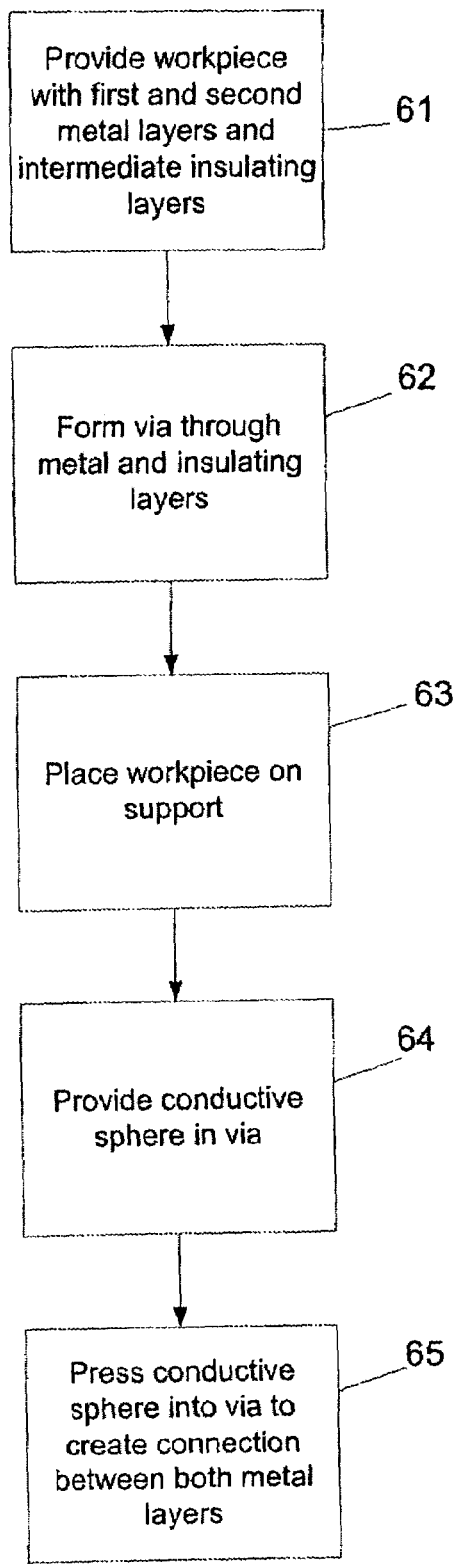
FIG. 6 is a flow diagram of a method for making the conductive connection shown in FIGS. 5a-b according to an embodiment of the present invention.

A flow chart of a method for making an electrical connection is provided in FIG. 6. In block 61, a workpiece is provided having an insulating layer with first and second metal layers on opposing sides of the workpiece. In block 62, a via is formed through the two metal layers where a connection is desired. After placing the workpiece onto a fixture support (block 63), in block 64, metal sphere is provided in the via. In block 65, the metal sphere is pressed into the via so as to create a connection between the two metal layers.

Figure 7A:
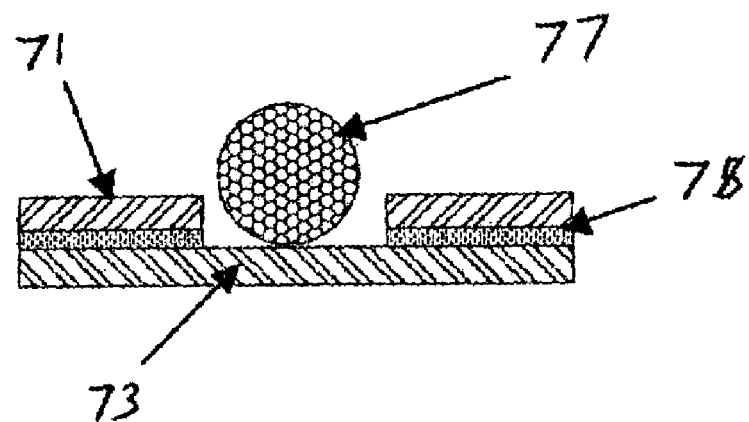
FIGS. 7a-b are cross sections of a workpiece showing the conductive connection of two metal layers according to another embodiment of the present invention.
Figure 7B:
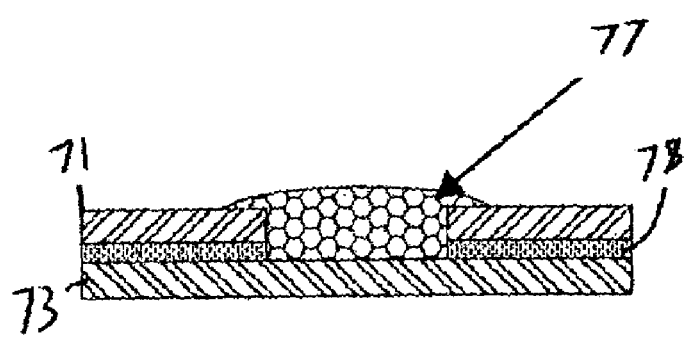

Referring to FIGS. 7a and b, a second embodiment of the present invention is shown. In this embodiment, rather than putting a via through both metal layers, a "blind hole" is formed through one of the metal layers and the insulating layer. Looking at FIGS. 7a and b, a first metal layer 71 is provided with a polyimide insulation layer 78. In this embodiment, the first metal layer is made of stainless steel. A second metal layer 73 is provided that is made of gold plated copper in this embodiment. The metal sphere 77 is placed into the blind hole. As shown in FIG. 7b, the metal sphere 77 is pressed into the blind hole so as to create a conductive connection between the first and second metal layers 71, 73. As with the example of FIGS. 5a-b, a support fixture may be provided under the blind hole for the pressing operation. Alternatively, the conductive ball could be presented in a form of smaller particles or smaller balls. In this case, the conductive material could be melted to wet the blind hole shown in FIG. 7b to form the electrical connection.

Figure 8:
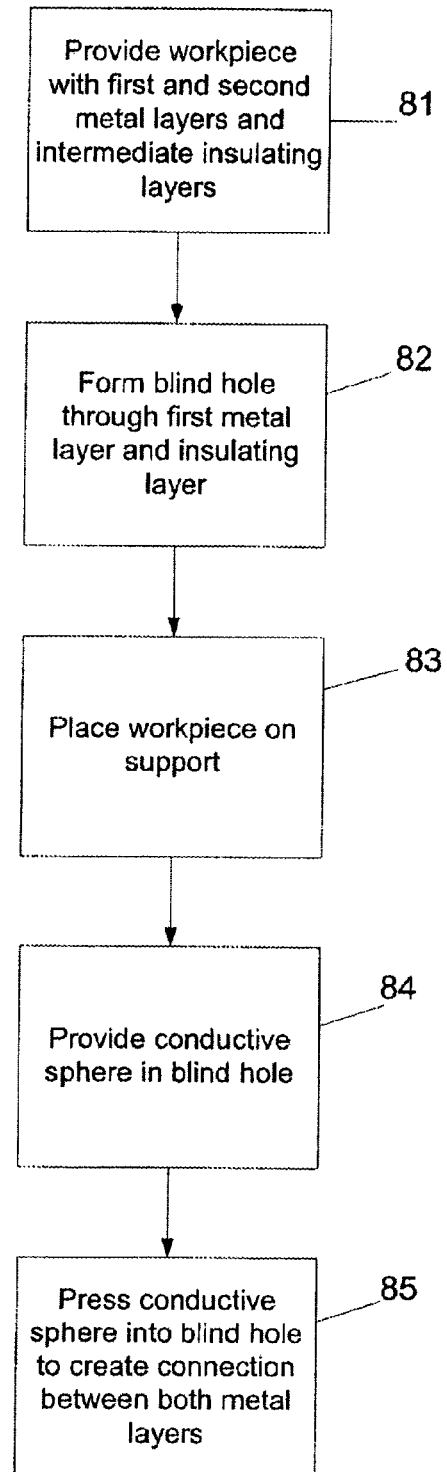
FIG. 8 is a flow diagram of a method for making the conductive connection shown in FIGS. 7a-b according to an embodiment of the present invention.

A flow chart for the apparatus of FIGS. 7a-b is shown in FIG. 8. In block 81, a workpiece is provided having an insulating layer with first and second metal layers on opposing sides of the workpiece. In block 82, a blind hole is formed through the first metal layer and the insulation layer where a connection is desired. After placing the workpiece onto a fixture support (block 83), in block 84, metal sphere is provided in the blind hole. In block 85, the metal sphere is pressed into the blind hole so as to create a connection between the two metal layers.

Figure 9:
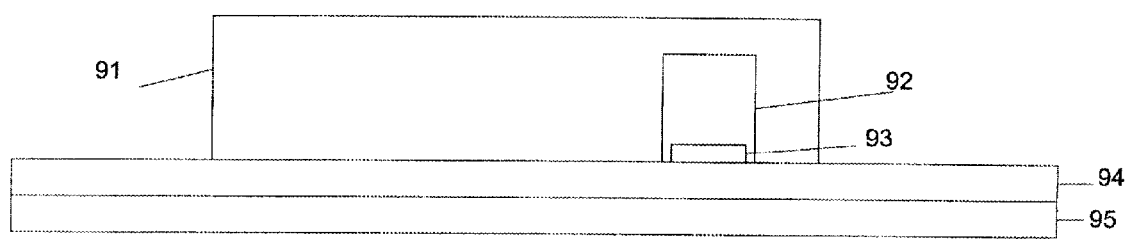
FIG. 9 is a cross section of a slider suspension showing a grounding pad and a metal suspension to use an embodiment of the present invention.

The use of the method and apparatus described above may be used in a variety of technical fields. In one example, the formation of an electrical connection between two metal layers can be applied to the manufacture of head suspension assemblies (HSAs) used for disk drives. Referring to FIG. 9, a cross section of an assembly is shown. In this embodiment, a slider 91 is provided with a grounding pad 92 in addition to the pads used for transmitting read and write signals. Copper traces are formed on the assembly in any of a variety of known manners including a bonding pad 93 for connection to the grounding pad 92 of the slider 91 (e.g., through solder ball bonding). In this embodiment, the suspension includes an insulation layer 94, and a stainless steel base 95. The copper traces may be formed as part of a flex suspension assembly (FSA) that includes an insulation layer and is attached to the stainless steel base. In this example, the stainless steel base 95 is coupled to ground. Accordingly, to connect the copper trace to the suspension, the method and apparatus described above may be used.

Figure 10A:
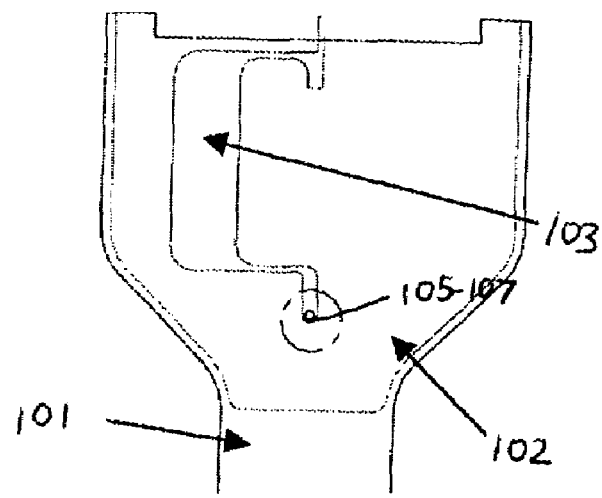
FIGS. 10a-b are plan views of a portion of a suspension for connecting a metal trace to a metal suspension according to an embodiment of the present invention.
Figure 10B:
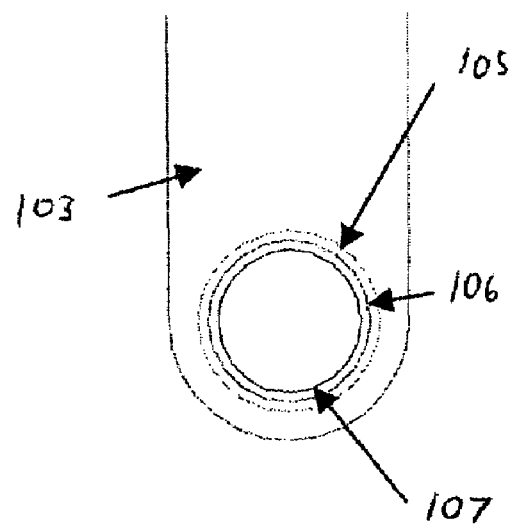

Referring to FIGS. 10a-b, a portion of a suspension is shown including a stainless steel base 101, an insulating layer 102 made of polyimide on top of the stainless steel base, and a copper trace 103 that is to be coupled to the grounding pad of the slider (not shown in FIG. 10a). As shown in FIG. 10b, a via 105 is made through the stainless steel base and through the polyimide insulating layer (via 106). With vias 105, 106 through the stainless steel base and insulating layer, a conductive sphere may then be pressed into the vias as with the blind hole embodiment described above. Alternatively, a via 107 may be made through the copper trace as well. In such a case, the metal sphere may be pressed into the three vias 105-107 to form a connection (preferably with a support fixture underneath the vias). Once all connections are made, the grounding pad of the slider is effectively connected to ground via the stainless steel base of the suspension and the metal trace.

While the present invention has been described with reference to the aforementioned applications, this description of the preferred embodiments is not meant to be construed in a limiting sense. It shall be understood that all aspects of the present invention are not limited to the specific depictions, configurations or dimensions set forth herein which depend upon a variety of principles and variables. Various modifications in form and detail of the disclosed apparatus, as well as other variations of the present invention, will be apparent to a person skilled in the art upon reference to the present disclosure. It is therefore contemplated that the appended claims shall cover any such modifications or variations of the described embodiments as falling within the true spirit and scope of the present invention.

For example, though gold spheres or gold-plated spheres are described in the implementations of FIGS. 3-10, other conductive materials may be used, including solder, copper and silver. Also, though the conductor used to make the electrical connection between two metal layers is spherical in shape in the embodiments of FIGS. 3-10, other shapes may be used.

What is claimed is:

1. A method of forming a conductive coupling between first and second conductive layers separated by an insulating layer comprising:
    forming a via in said first conductive layer;
    forming a via in said insulating layer;
    forming a via in said second conductive layer; and
    positioning a conductive sphere in said vias to create a conductive connection between said first and second conductive layers.

2. The method of claim 1 wherein said positioning includes pressing said conductive sphere into said vias.

3. The method of claim 1 wherein said positioning includes ultrasonic bonding said conductive sphere to said first and second conductive layers.

4. A method of forming a conductive coupling between first and second metal layers separated by an insulating layer comprising:
    forming a via in the first metal layer;
    forming a via in the insulating layer;
    forming a via in said second metal layer; and
    positioning a metal sphere in said vias to create a conductive connection between said first and second conductive layers.

5. The method of claim 4 wherein said positioning includes pressing said metal sphere into said vias.

6. The method of claim 4 wherein said positioning includes ultrasonic bonding said metal sphere to said first and second conductive layers.

7. The method of claim 4 further comprising:
    forming a via through said second metal layer prior to said positioning operation.

8. The method of claim 7 wherein said first and second metal layers and said insulating layer are part of a workpiece, the method further comprising:
    positioning said workpiece on a support fixture prior to said positioning operation.

9. The method of claim 8 wherein said support fixture has a space between a surface of the support fixture and the vias in said workpiece.

10. The method of claim 9 further comprising:
    pressing said metal sphere into said vias and against said support fixture.

11. The method of claim 10 wherein said metal sphere is made of at least one of the following: gold, silver and copper.

12. A circuit comprising:
    a first conductive layer having a via;
    a second conductive layer having a via;
    an insulating layer between said first and second layers, said insulating layer having a via aligned with the via of said first conductive layer; and
    a conductive sphere positioned in said vias to form a conductive connection between said first and second metal layers.

13. The circuit of claim 12 wherein said second conductive layer includes a via aligned with the vias of said first conductive layer and said insulating layer.

14. The circuit of claim 13 wherein said conductive sphere is made of one of the following: gold, silver, and copper.

15. A head suspension assembly comprising:
a metal suspension;
a first metal layer on said suspension;
an insulating layer between said metal layer and said metal suspension, wherein said metal layer, said metal suspension and said insulating layer each have aligned vias; and
a conductive sphere disposed in said vias to conductively connect said metal suspension to said metal layer.

16. The head suspension assembly of claim 15 wherein said suspension includes a via aligned with the vias of said metal layer and insulating layer.

17. The head suspension assembly of claim 15 wherein said conductive sphere is made of one of the following: gold, silver, and copper.

* * * * *